United States Patent [19]

Ruescher

[11] Patent Number: 5,531,558
[45] Date of Patent: Jul. 2, 1996

[54] SPARE TIRE LIFTING DEVICE

[76] Inventor: Edward H. Ruescher, 7714 Wild Eagle, San Antonio, Tex. 78255

[21] Appl. No.: 263,578

[22] Filed: Jun. 22, 1994

[51] Int. Cl.⁶ ............................................. B62D 43/04
[52] U.S. Cl. .................. 414/463; 224/42.21; 224/42.23; 414/466
[58] Field of Search .......................... 414/463–466; 224/42.12, 42.21, 42.23, 42.41, 42.06, 538

[56] References Cited

U.S. PATENT DOCUMENTS

| | | | |
|---|---|---|---|
| 1,406,632 | 2/1922 | Flintermann | 414/463 X |
| 2,773,719 | 12/1956 | Walker | 414/463 X |
| 2,855,118 | 10/1958 | Bliss | 414/466 |
| 3,223,263 | 12/1965 | Fielding | 414/463 |
| 3,390,864 | 7/1968 | Searcy et al. | 414/463 X |
| 3,952,894 | 4/1976 | Mendez | 414/463 |
| 4,047,629 | 9/1977 | Klein | 224/42.41 X |
| 4,060,171 | 11/1977 | Ludwig | 414/463 |
| 4,174,797 | 11/1979 | Yasue et al. | 224/42.43 X |
| 4,221,312 | 9/1980 | Wertjes | 224/42.43 X |
| 4,221,528 | 9/1980 | Gordos | 414/463 X |
| 4,329,107 | 5/1982 | Smith | 414/463 |
| 4,449,881 | 5/1984 | Lane | 414/463 X |
| 4,522,325 | 6/1985 | McMillan | 224/42.43 X |

FOREIGN PATENT DOCUMENTS 1416531  9/1965  France .

*Primary Examiner*—David A. Bucci
*Attorney, Agent, or Firm*—Cox & Smith Incorporated

[57] ABSTRACT

A device to assist in lowering and raising the spare tire on a pickup truck. The device consists of a winch operated by a ratchet assembly to wind or unwind a strap to raise or lower the spare tire relative to a stored position. The device is installed on the pick up truck by a strap and hook assembly on the rear bumper, or on the bumper support bracket by an integral hanger.

8 Claims, 3 Drawing Sheets

SPARE TIRE LIFTING DEVICE

FIELD OF THE INVENTION

This device relates generally to automotive accessories and specifically to devices which lower and raise a spare tire from and to a storage position beneath the bed of a pick up truck.

BRIEF DESCRIPTION OF THE PRIOR ART

The spare tire for pickup trucks is typically mounted beneath the bed of the pickup truck near the rear axle. Some imported and small pickup trucks include a winch assembly to lower and raise the spare tire. Most American full size pickup trucks (and some smaller sizes) have their tire held in place with a hinged cross strap bolted to the frame.

Because of this arrangement, it is difficult and inconvenient to remove and replace the truck's spare tire. For example, to remove the spare tire from the pickup truck, you have to lay on your back. A screw device such as a wing nut or similar device that holds one end of the cross strap must be loosened with one hand while holding the cross strap in place with the other hand to prevent the spare tire from falling on you after the holding screw is removed. To replace the spare tire, the cross strap with the spare tire attached must be raised and held in place with one hand while the wing nut or other holding screw is replaced with the other hand.

A number of prior art patents have addressed this problem. For example, U.S. Pat. No. 4,522,325 to McMillan discloses an actuating lever permanently and pivotally attached to the rear bumper of the pickup truck. A flexible cable couples the actuating lever to the existing spare tire cross strap through a series of pulleys. Moving the actuating lever away from the bumper causes the cable to be extended thus lowering the spare tire. Several problems exist with this device as follows:

If the actuating lever is permanently attached on the top of the rear bumper, it can be a trip hazard when entering or exiting the bed of the truck. Additionally, the actuating lever can interfere with the use of the truck for pulling a trailer.

Because the device is permanently installed on the truck, the rotating mechanism and, more importantly, the cable are subjected to all ambient corrosive elements. In time, the actuating mechanism can become frozen or in the case of the cable, it can become weakened and unsafe to use.

U.S. Pat. No. 4,329,107 to Smith discloses a spare tire carrier including a lever arm pivotally attached to a pickup truck's rear bumper. A pair of pulleys are attached to the pickup truck's frame and a cable is attached to the lever and trained over the pulleys. The free end of the cable is attached to a member which engages the hub of the spare tire's wheel. A similar device is described in U.S. Pat. No. 3,390,864 to Searcy.

A different approach to raising and lowering a pickup's spare tire is described in U.S. Pat. No. 4,060,171 of Ludwig. Ludwig describes a spare tire carrier including a pivotal support brace and a plurality of linkage members coupling a free end of the support brace to the pickup truck's frame. Lowering mechanisms are provided to extend the length of the linkage and thus lower the pivotal support brace to allow the removal of the spare tire.

A common problem with all these prior art spare tire lowering mechanisms is that they are relatively complex and are difficult to install. Furthermore, the prior art devices require that the existing spare tire cross strap be removed in order to install the new mechanism. Because of these problems, the tire lowering devices of the prior art have not been widely adopted.

SUMMARY OF THE INVENTION

An object of this invention is to provide a device for raising and lowering a pickup truck's spare tire to a storage position which is simple to install, use, remove, and store between uses.

Another object of this invention is to provide a device for raising and lowering a spare tire to a storage position which utilizes a pickup truck's existing spare tire cross strap and conventional tire tool as part of its assembly.

Briefly, the invention consists of the factory installed spare tire cross strap, the factory provided tire tool, and a lowering/raising device which is made up of the following: (1) a ratchet operated winch that is temporarily attached to the bumper support frame with a metal hook, or temporarily attached to the bumper of the pickup truck with a nylon strap and hook assembly; and (2) a nylon strap having one end wound on the drum of the ratchet assembly and defining a loop on its other end through which the factory provided tire tool is inserted and connected to the factory provided spare tire cross strap.

DESCRIPTION OF PREFERRED EMBODIMENTS

Figure 1:
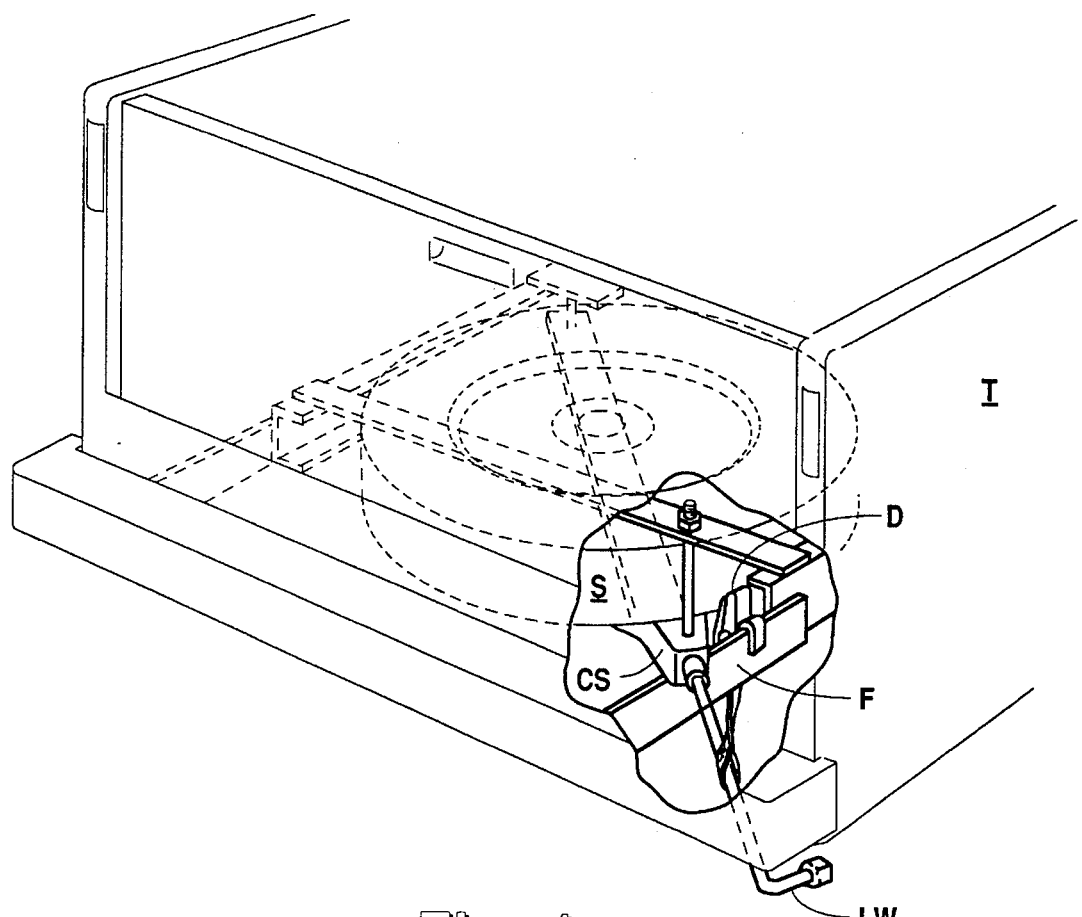
FIG. 1 is a schematic perspective view of the overall geometry for use of the device.

FIG. 1 shows the overall set up for use of a mechanism D for raising and lowering a spare tire S from a position beneath the bed of a pickup truck T having a frame member F, an elongated lifting bar ( spare tire cross strap ) CS, and a lug wrench L.

Figure 2:
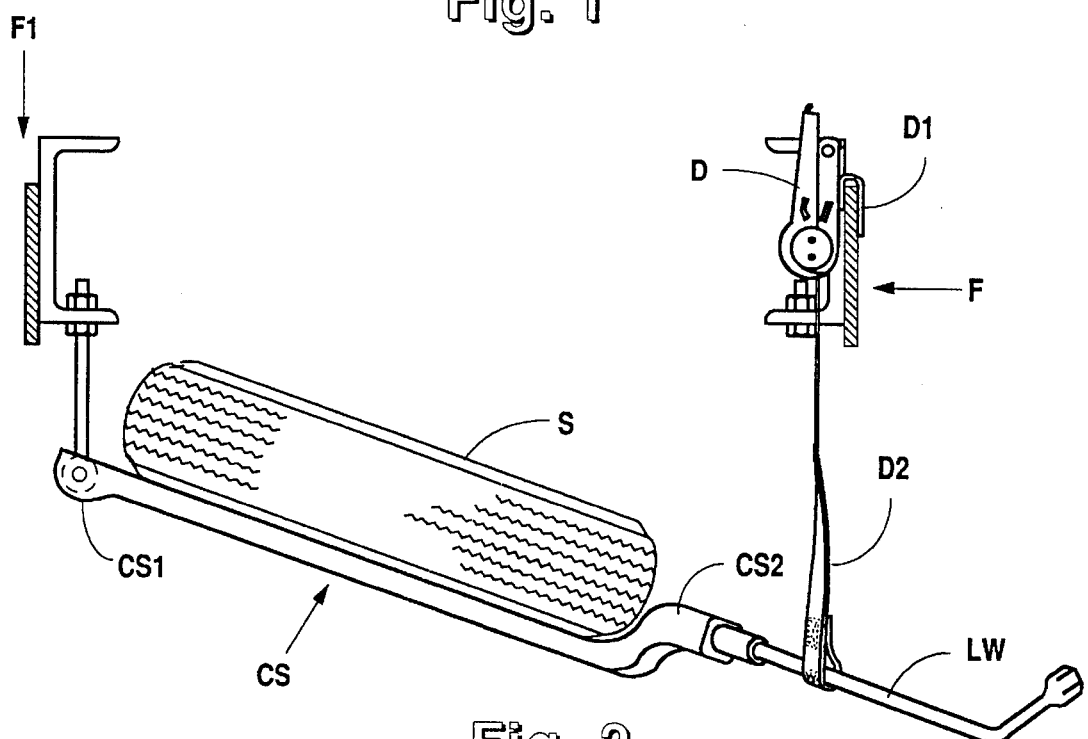
FIG. 2 is a schematic perspective view showing the details of the set up geometry of the device as used on a Ford pickup truck.

FIG. 2 shows the detailed view of the geometrical set up for a Ford pickup truck (other pickup trucks may have a slightly different geometry). The elongated lifting bar CS is pivotally mounted by a ball joint CS1 at one end of the bed or frame of the pickup truck CS1 and extends diametrically to the opposite side of the spare tire S. The lifting bar CS is contoured as indicated at CS2 to snugly engage the spare tire S. The lifting force is applied to the elongated lifting bar CS by means of a detachably mounted ratchet actuated winch D consisting of a hook D1 to temporarily mount said winch to the frame F in a position generally in line with the major axis of the elongated lifting bar CS and preferably near the free end thereof. The winch D is connected to the lifting bar CS by means of a flexible lifting strap D2 having one end secured to the reel D6 of the winch D. Normally, the truck's existing lug wrench LW or other bar extensions is inserted through the loop in one end of the elongated lifting strap and into the hollow end of the lifting bar CS. Note: As previously stated, the device as shown is in the configuration for a Ford pickup truck. Other pickup trucks may have a slightly different configuration for the elongated lifting bar. However, the design of the device embodying this invention is such that it will accommodate all known spare tire holding device configurations.

Figure 3:
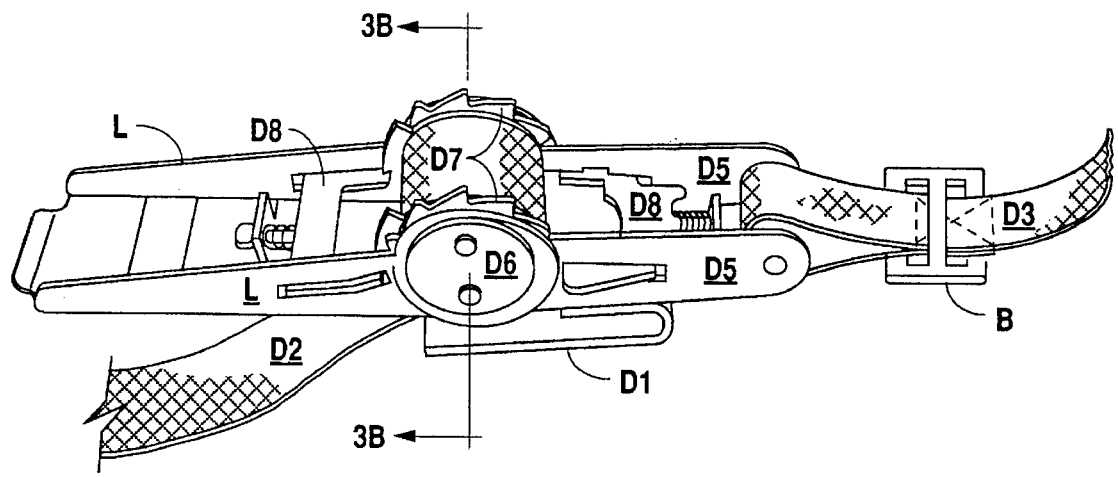
FIG. 3 is schematic perspective view of the device in the open position to show the details of the operating mechanism.

FIG. 3 is an schematic perspective view of the device in the open position to show the details of the winch mechanism, the ratchet assembly, the spring biased latches, the mounting hook, the elongated lifting strap, and the adjustable mounting belt.

Figure 4:
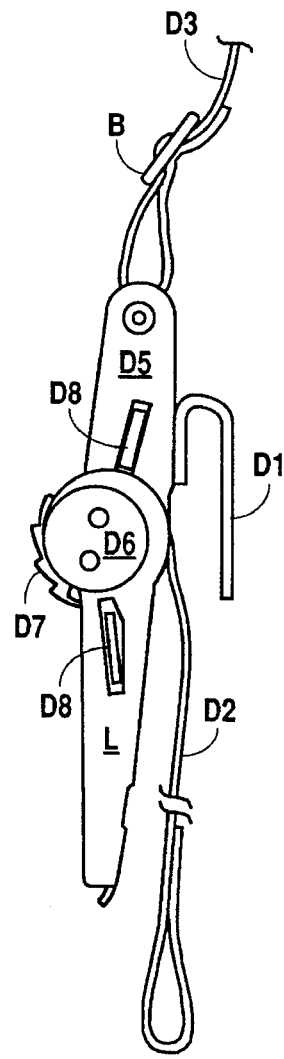
FIG. 4 is a side view of the device in the open position.

The ratchet actuated winch D is of conventional construction and is operated by reciprocating the actuating lever L about its axis to wind the flexible lifting belt D2 around the reel assembly D6. The reel assembly is prevented from unwinding by the combined action of the ratchet gears D7 and the spring biased latches D8. The ratchet gears are disengaged to lower the spare tire by pulling one of the spring biased latches on the lever away from the ratchet gears and moving the lever L to the full open position as shown in FIG. 4.

The following are descriptions of the components of the ratchet actuated winch shown in FIG. 3: D1 is the permanently mounted hook used for detachably mounting the device on a frame member of the pickup truck.

D2 is the flexible lifting belt used to raise and lower the elongated lifting bar. The flexible lifting strap is shown inserted and wound on the cylindrical shaft D6.

D3 is the adjustable flexible mounting strap used, when necessary, to detachably mount the device on the bumper or other frame member for proper alignment with the elongated lifting bar.

D5 is the winch frame comprising a U shaped element.

D6 is the cylindrical shaft rotatably mounted in the winch frame D5. The cylindrical shaft is slotted to permit insertion of the elongated flexible lifting belt D2.

D7 is the ratchet gear secured to said rotatable cylindrical shaft D6 in a coaxial relationship to permit the incremental movement of said cylindrical shaft. The movement of said cylindrical shaft provides for the raising or lowering of the elongated lifting bar to properly position the elongated lifting bar CS for removal or stowing of the spare tire S.

D8 are the spring biased latches used to prevent unwanted unwinding of the elongated flexible lifting belt, when engaged, and to permit rapid unwinding of the elongated flexible lifting belt for lowering of the elongated lifting bar CS when disengaged.

(L) is the lever which, when moved about its axis with the spring biased latches engaged, provides the lifting force to raise the pickup truck's spare S tire to its stowed position.

(B) is the buckle used to adjust the length of the flexible detachably mounting strap D3 for a proper fit.

Figure 3B:
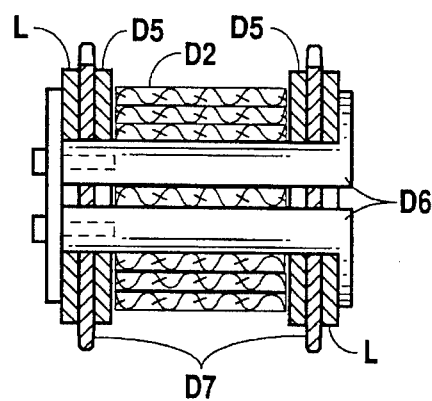
FIG. 3B is a cross sectional schematic view showing the positional relationship of the reel, ratchet, and lifting belt.

FIG. 3B is a cross sectional view showing the details of the spatial relationship of the elongated lifting strap D2, the cylindrical shaft D6, and the ratchet assembly D7.

FIG. 4 is a side view of the device With the actuating lever L in the open position.

D1 is the permanently mounted hook for detachably mounting the device on directly to the frame member supporting the bumper.

D2 is the flexible lifting belt wound on the reel assembly. The flexible belt is adjustable to accommodate different height pickup trucks.

Figure 5:
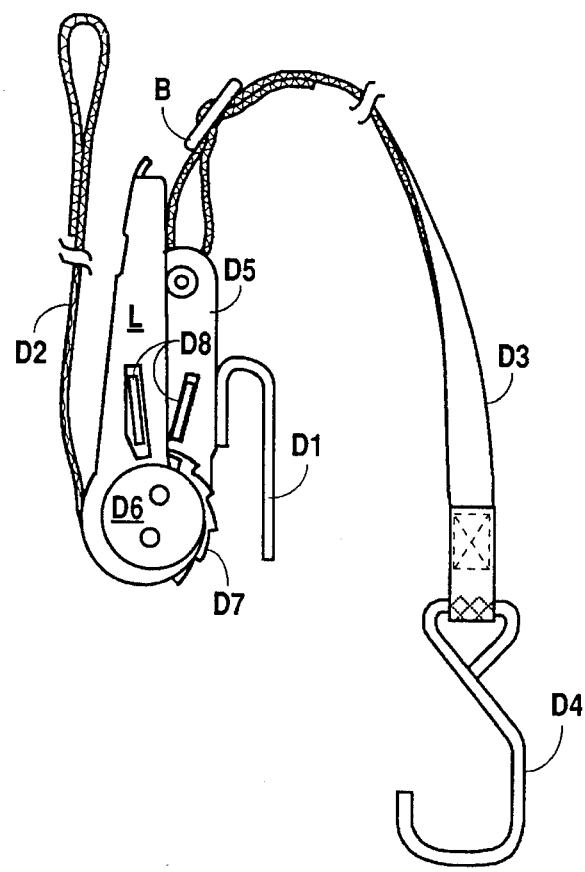
FIG. 5 is a side view of the device in the closed position.
Figure 6:
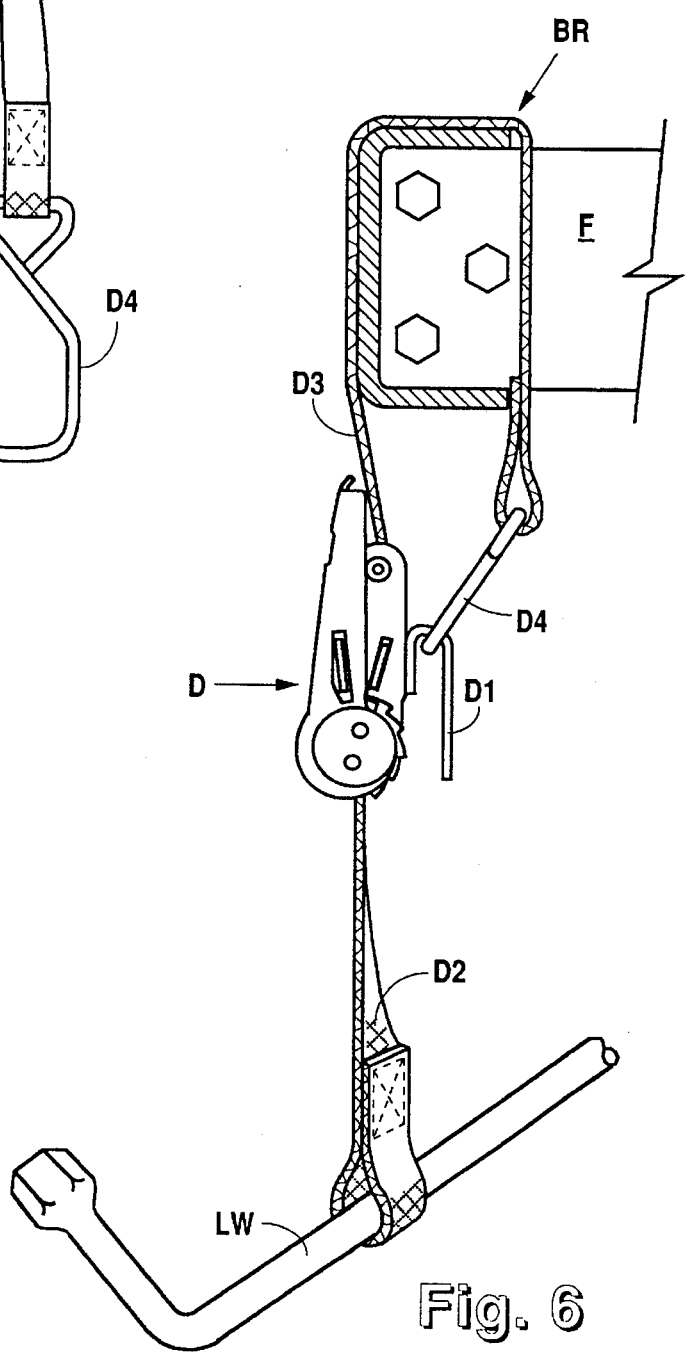
FIG. 6 is a schematic perspective view of an alternate method of detachably mounting the device on a pickup truck.

FIG. 5 is a side view of the device with the actuating lever L in the closed position FIG. 6 shows a typical variation of the set up geometry. This set up geometry is utilized when, to optimize the alignment of the mechanism D with the elongated lifting bar, the mechanism D is detachably mounted to the bumper BR of the pickup truck with an adjustable flexible mounting belt D3. Also shown is an adjustable flexible lifting belt D2 and the pickup truck's lug wrench LW.

There are several significant advantages to this invention as follows:

there is no retro-fitting or modification of the pickup truck as the invention utilizes, to the maximum extent possible, existing supplied equipment.

the device is easily attached to the pickup truck's bumper for use.

the rachet mechanism permits a completely controlled action.

the device is small and easily stored between, uses out of the elements thus eliminating corrosion.

While this invention has been described in terms of a few preferred embodiments, it is contemplated that persons reading the preceding descriptions and studying the drawings will realize various alterations, permutations and modifications thereof. It is therefore intended that the following appended claims be interpreted as including all such alterations, permutations, and modifications as fall within the true spirit and scope of the present invention.

I claim:

1. Apparatus for raising and lowering a spare tire for an automotive vehicle having a frame to a suspended position beneath the frame of the automotive vehicle, comprising, in combination:

an elongated lifting bar horizontally pivotally mounted at one end of said frame and shaped to underlie said spare tire in generally diametric relation thereto;

the other end of said bar extending beyond said spare tire, whereby a lifting force applied to said other end of said lifting bar will elevate said spare tire to a stowed position relative to said vehicle frame;

an elongated flexible lifting element;

a winch having a frame and a reel rotatably mounted on said frame for wrapping one end of said flexible lifting element thereon;

means for detachably mounting said winch frame to a portion of said vehicle frame at a position generally overlying all positions of said other end of said lifting bar;

means including a manual actuating lever pivoted on said winch frame for incrementally rotating said reel to wind said flexible lifting element; and means for detachably securing the other end of said flexible lifting element to said other end of said lifting bar, whereby incremental rotation of said reel will wind said flexible lifting element thereon and elevate said tire to its said stowed position.

2. The apparatus of claim 1 wherein said winch frame comprises a U-shaped element having laterally spaced side walls;

shaft means rotatably supported by said side walls;

said reel being rotatably mounted by said shaft means;

a ratchet gear secured to one end of said reel in coaxial relation thereto; and said manual actuating lever being mounted on said shaft means and operably engagable with said ratchet gear to intermittently rotate said reel to wind said flexible lifting element thereon.

3. The apparatus of claim 2 further comprising spring biased latch means engagable with said ratchet gear to prevent unwinding movement thereof.

4. The apparatus of claim 1 wherein said means for detachably mounting said winch frame to said vehicle frame comprises a hook element secured to said winch frame and detachably engagable with said vehicle frame portion.

5. The apparatus of claim 1 wherein said means for detachably mounting said winch frame to said vehicle frame comprises an elongated strap having one end secured to said winch frame and the other end looped over said vehicle frame portion and detachably secured to said winch frame.

6. The apparatus of claim 1 further comprising a tire wrench having an elongated handle portion;

said other end of said lifting bar defining an elongated hole dimensioned to permit insertion of said tire wrench handle portion therein to impart a lifting force to said other end of said lifting bar; and said other end of said lifting belt forming a closed loop traversed by said handle portion.

7. In a truck having an articulate frame, a spare tire, and an elongated lifting bar horizontally pivotally mounted at one end of said frame and shaped to underlie and support said spare tire in a stowed position when the one end of the said lifting bar is elevated and secured in said elevated position the improvement comprising:

an elongated flexible lifting element;

a winch having a frame and a reel rotatably mounted on said frame for wrapping one end of said flexible lifting element thereon;

a hook element secured to said winch frame and detachably engagable with a portion of said truck frame at a position generally overlying all positions of said lifting bar;

ratchet means on said winch frame for incrementally rotating said reel to wind said flexible lifting element thereon; and means for detachably securing the other end of said flexible lifting element to said other end of said lifting bar, whereby ratcheting rotation of said reel will wind said flexible lifting element thereon and elevate said spare tire to its said stowed position.

8. In a truck having an articulated frame, a spare tire, and an elongated lifting bar horizontally pivotally mounted on one end of said frame and shaped to underlie and support said spare tire in a stowed position when the other end of said lifting bar is elevated and secured in said elevated position, the improvement comprising:

an elongated flexible lifting element;

a winch having a frame and a reel rotatably mounted on said frame for wrapping one end of said flexible lifting element thereon;

an elongated strap having one end secured to said winch frame and the other end looped over a portion of said truck frame and detachably secured to said winch frame:

ratchet means on said winch frame for incrementally rotating said reel to wind said flexible lifting element thereon; and means for detachably securing said other end of said flexible lifting element to said other end of said lifting bar, whereby ratcheting rotation of said reel will wind said flexible lifting element thereon and elevate said spare tire to its said stowed position.

* * * * *